United States Patent [19]

Murakoshi et al.

[11] 4,341,128

[45] Jul. 27, 1982

[54] DEVICE FOR MOVING A SLIDABLE STAGE ON A TWO-DIMENSIONAL PLANE

[75] Inventors: Makoto Murakoshi; Tamotu Yoshizawa, both of Asaka, Japan

[73] Assignee: Fuji Photo Film Co., Ltd., Kamagawa, Japan

[21] Appl. No.: 159,170

[22] Filed: Jun. 13, 1980

[30] Foreign Application Priority Data

Jun. 15, 1979 [JP] Japan .................................. 54-75497

[51] Int. Cl.³ ...................... G05G 11/00; G05G 25/20
[52] U.S. Cl. ..................................... 74/479; 33/1 M; 74/424.6; 350/86
[58] Field of Search ................. 74/424.6, 479; 350/86; 108/143; 269/71; 33/1 M

[56] References Cited

U.S. PATENT DOCUMENTS 3,785,316  1/1974  Leming .................................. 74/479
4,270,404  6/1981  Murakoshi ........................... 74/479

FOREIGN PATENT DOCUMENTS 13467 of 1903 United Kingdom .................. 350/86

Primary Examiner—Allan D. Herrmann
Attorney, Agent, or Firm—Pasquale A. Razzano

[57] ABSTRACT

A pair of parallel lead screws are meshed with a pair of helical racks provided on opposite faces of a movable stage slidable on a flat or cylindrical base plate. The pair of parallel lead screws are driven by a pair of electric motors independently of each other. One of the helical racks has teeth extending in a direction to intersect with the teeth of the other helical rack. By selecting the direction of rotation of the pair of lead screws independently, the direction of movement of the stage can be selected. The stage may be made of a pair of plates having the helical racks on the inner or outer faces of the plates.

11 Claims, 6 Drawing Figures

DEVICE FOR MOVING A SLIDABLE STAGE ON A TWO-DIMENSIONAL PLANE

BACKGROUND OF THE INVENTION

1. Field of the Invention

This invention relates to a device for moving a stage on a surface, and more particularly to a device for sliding a stage slidable on a flat or cylindrical surface.

2. Description of the Prior Art

A device for moving or sliding a stage on a two-dimensional surface is widely used in various fields like a microfilm recording apparatus, an inspection device for IC elements, a plotter for a drafting machine and the like. In such a stage moving device, it is desired that the stage be moved at a high speed and the stage be settled at a desired position with high accuracy and with a short settling time.

In a computer output microfilmer (COM) for recording a computer output on a microfilm, for instance, it is required that the stage which holds a microfilm be moved to a desired position at a high speed and with high accuracy and then be moved to the next position quickly to successively record the information at a very high speed. In order for the COM to record the information on the microfilm immediately after the film is stopped, the vibration of the stage must be quickly stopped after the stage is stopped at the desired position. In other words, the settling time from the stoppage of the driving source like a motor used for moving the stage up to the desired position to the complete stoppage of the vibration of the stage is desired to be as short as possible. In the conventional devices, however, the settling time is not short enough to provide a practically satisfactory high speed COM. It should be noted here that the vibration of the stage may not be perfectly stopped for the information to be recorded on the microfilm, but may be substantially stopped or damped to a negligible level.

As the conventional X-Y moving devices are known, for example, those as shown in Japanese Patent Publication No. 49(1974)-14266, Japanese Patent Publication (first publn.) No. 48(1973)-63722, Japanese Patent Publication (first publn.) No. 53(1978)-3816, Japanese Utility Model Publication (first publn.) No. 53(1978)-6640 and Japanese Utility Model Publication (first publn.) No. 53(1978)-6641. The X-Y moving devices as shown in these publications are all used for a microfilm camera and employs electric motors for driving the mechanism in X- and Y-directions respectively. Many of these devices have one mechanism for moving the stage in one direction (e.g. Y-direction) on the other mechanism for moving the stage in the other direction (e.g. X-direction). In such a mechanism, the motor used for moving the stage in X-direction needs a large torque. Further, in order to transmit a driving power to the mechanism for moving the stage in Y-direction, it is necessary to put the motor for moving the stage in Y-direction on the mechanism for moving the same in X-direction or to transmit the power by way of a spline or the like. Thus, in the above-described devices for moving the stage on a two-dimensional surface, a motor of large torque or a complex mechanism for transmitting power is necessitated, and further it is difficult to make the size of the device compact.

SUMMARY OF THE INVENTION

It is, therefore, the primary object of the present invention to provide a device for moving a stage in a two-dimensional plane which does not need a motor of large torque nor a complex mechanism for power transmission.

Another object of the present invention is to provide a device for moving a stage with a comparatively small power and with a simple mechanism not only on a flat surface but also on a cylindrical surface.

Still another object of the present invention is to provide a device for moving a stage in X- and Y-directions at a high speed and with high accuracy.

The stage moving device in accordance with the present invention is characterized in that a stage is moved by use of a pair of parallel lead screws screw engaged with the stage and separately driven by a pair of drive means. In more detail, the stage moving device of this invention comprises a pair of parallel lead screws, a pair of driving means for independently driving the pair of lead screws, a movable stage having a first face opposed to said first lead screw and a second face opposed to said second lead screw and extending in parallel to said first face, a first helical rack extending perpendicular to said first lead screw on said first face of the stage and meshed with said first lead screw, and a second helical rack extending perpendicular to said second lead screw on said second face of the stage and meshed with said second lead screw, teeth of said second helical rack extending in the direction of intersecting with teeth of said first helical rack.

Since the X-Y moving device in accordance with the present invention is not of the structure having one mechanism on the other, the two motors used can be of the same power and accordingly the design of the device is easy. Further, when the motors are driven to move the stage, the two motors are concurrently driven to move the stage and accordingly the load of the respective motors is made small and the torque thereof may not be so large. Further, the surface of a base plate on which the stage slides when moved may not be flat but may be cylindrical with its axis extending parallel to X or Y direction. Since the structure of the device can be made simple by using a pair of the same motors in parallel for a single stage, the settling time can be made sufficiently short and a high speed COM can be manufactured.

DESCRIPTION OF THE PREFERRED EMBODIMENTS

Figure 1:
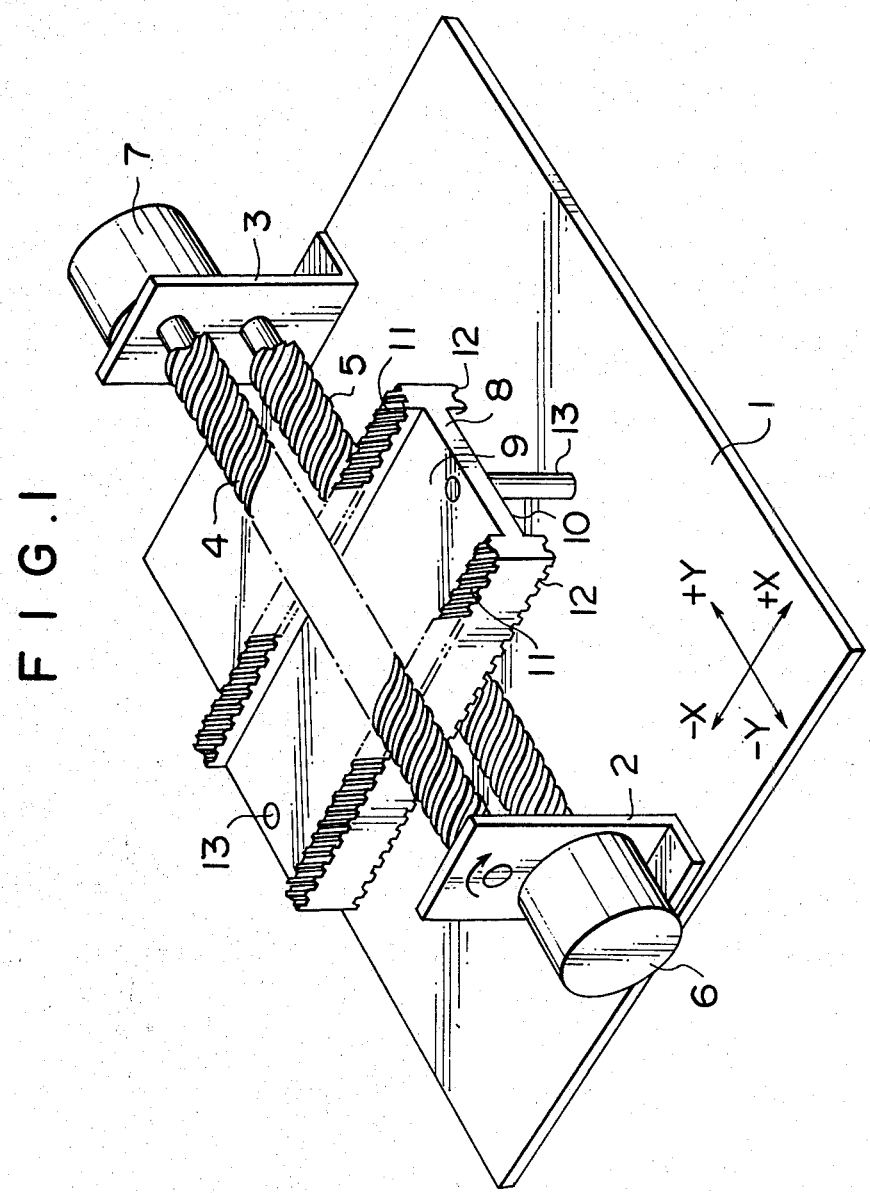
FIG. 1 is a perspective view of an X-Y moving device in accordance with an embodiment of the present invention.

Now a preferred embodiment of the present invention will be described in detail with reference to FIG. 1. Referring to FIG. 1, a pair of support plates 2 and 3 are fixed to a flat base plate 1 having a flat slide surface. The pair of support plates 2 and 3 extend at right angle with the base plate 1 and supports a pair of parallel lead screws 4 and 5 at the opposite ends. The pair of parallel lead screws 4 and 5 are arranged in parallel to each other and separated in the vertical direction and rotatably supported by the support plates 2 and 3. It is essential that the pair of lead screws 4 and 5 should extend in parallel to the surface of the base plate 1. Both the lead screws 4 and 5 have the right thread. A pair of electric motors 6 and 7 are provided for driving the pair of lead screws 4 and 5, respectively, so that the lead screws 4 and 5 may be driven independently of each other.

Between the two lead screws 4 and 5 is provided a movable stage 8 made of a single flat plate slidable on the surface of the base plate 1. The movable stage 8 has a first face 9 faced to one of said lead screw 4 and a second face 10 faced to the other lead screw 5. The lead screw 4 on the first face 9 side of the movable stage 8 will be referred to as a first lead screw and the lead screw 5 on the second face 10 side thereof will be referred to as a second lead screw. On the first face 9 of the movable stage 8 is provided a pair of first helical racks 11 meshed with the first lead screw 4 and extending in the direction perpendicular to the first lead screw 4. On the other hand, on the second face 10 of the movable stage 8 is provided a pair of second helical racks 12 meshed with the second lead screw 5 and extending in the direction perpendicular to the second lead screw 5. Since the lead screws 4 and 5 have the thread of the same direction, the direction of the teeth of the helical racks 11 and 12 is made to intersect with each other. These teeth are desirably made to incline at 45° with respect to the lengthwise direction of the racks 11 and 12. These racks 11 and 12 may be formed integral with the movable stage 8 or may be made separately and affixed to the stage 8 afterwards. The stage 8 has a pair of legs 13 the lower end of which is in slide contact with the surface of the base plate 1.

Now the operation of the above described X-Y moving device in accordance with the first embodiment of the present invention will be described in detail referring to FIG. 1. In the description, the direction of movement will be defined as +X, +Y, -X, and -Y as shown in FIG. 1.

Figure 2:
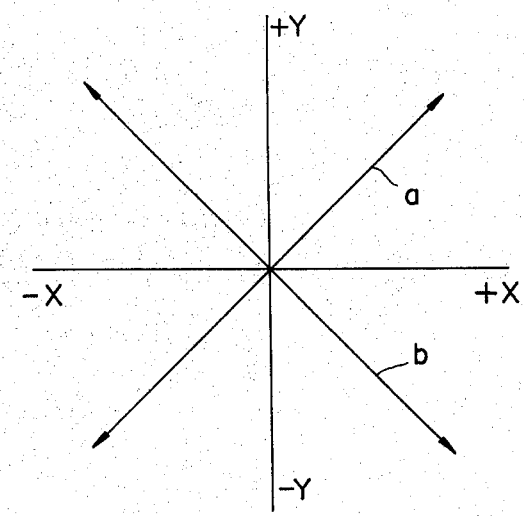
FIG. 2 is an explanatory view for explaining the movement of the movable stage of the X-Y moving device of the present invention as shown in FIG. 1.

At first, the operation of the device when the second lead screw 5 is stopped and only the first lead screw 4 is rotated will be described. As the first lead screw 4 is rotated with the second lead screw 5 held not rotated, the movable stage 8 is moved in the direction of +X+Y or -X-Y as shown at the line-a in FIG. 2 being confined by the meshing engagement of the second helical racks 12 and the second lead screw 5. Since the lead screw 4 has a right thread, the stage 8 moves in the -X-Y direction when the lead screw 4 is rotated in the clockwise direction in FIG. 1 as shown by an arrow, and moves in the +X+Y direction when it is rotated in the counterclockwise direction.

Then, the operation of the device when the first lead screw 4 is stopped and only the second lead screw 5 is rotated will be described. When the second lead screw 5 is rotated with the first lead screw 4 held not rotated, the movable stage 8 is moved in the direction of +X-Y or -X+Y as shown at the line-b in FIG. 2 being confined by the meshing engagement of the first helical racks 11 and the first lead screw 4. Since the lead screw 5 has a right thread, the stage 8 moves in the +X-Y direction when the lead screw 5 is rotated in the clockwise direction in FIG. 1 and moves in the -X+Y direction when it is rotated in the counterclockwise direction.

Therefore, by making the pair of helical racks have teeth of the same pitch inclined at 45° with respect to the lengthwise direction of the racks, it is possible to move the stage 8 in ±X or ±Y direction by rotating the lead screws 4 and 5 in the opposite directions by the same amount. The relation between the direction of rotation of the lead screws 4 and 5 and the direction of movement of the stage 8 is as shown in the table below.

| Direction of Stage Movement | Direction of Rotation First Lead Screw 4 | Direction of Rotation Second Lead Screw 5 |
| --- | --- | --- |
| +X | Counterclockwise | Clockwise |
| -X | Clockwise | Counterclockwise |
| +Y | Counterclockwise | Counterclockwise |
| -Y | Clockwise | Clockwise |

In the above table, the direction of rotation of the lead screws 4 and 5 is defined as seen from the support plate 2 in FIG. 1.

Further, by varying the amount of rotation of the lead screws 4 and 5 in various ways, the direction of movement of the movable stage 8 can be variously changed. It should be noted that the slidable legs 13 may be eliminated when the stage 8 is not required to be so accurately slid or is connected with other supporting means.

In the above described embodiment shown in FIG. 1, the movable stage 8 is made of a single plate material. The stage, however, may be made of a pair of plates combined together. Several examples of the structure composed of a stage made of a pair of plates and a pair of lead screws will now be described with reference to FIGS. 3 to 6. In FIGS. 3 to 6, the lead screws and the stage are schematically illustrated with the teeth of the lead screws and the helical racks on the stage omitted.

Figure 3:
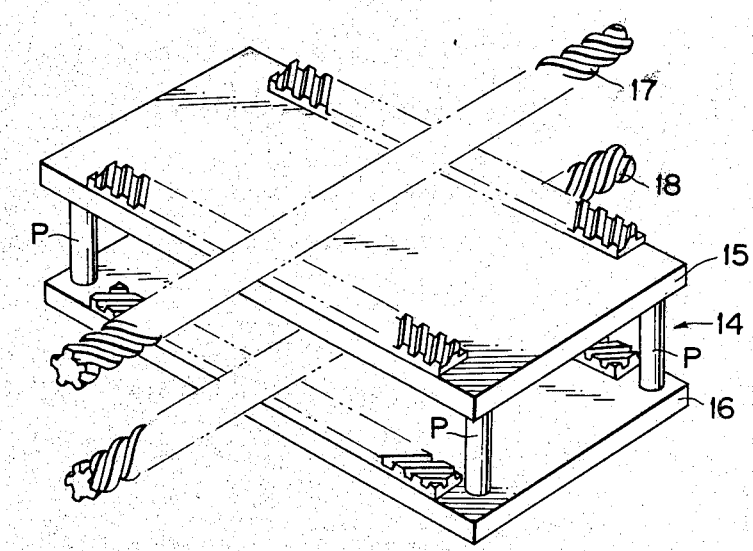
FIG. 3 is a perspective view showing the relation of the positions of the movable stage and lead screws in a second embodiment of the invention.

Referring to FIG. 3, a movable stage 14 is composed of a pair of plates 15 and 16 both extending in parallel to the base plate 1 and combined together by means of coupling pins P coupling the pair of plates 15 and 16 together at four corners. Though not shown in the drawing, the upper plate 15 is provided on the upper face thereof with helical racks similar to said helical racks 11 and the lower plate 16 is also provided on the upper face thereof with helical racks similar to said helical racks 12. The teeth of the helical racks on the upper plate 15 extend in the direction to intersect with the teeth of the helical racks on the lower plate 16. The helical racks are meshed with lead screws 17 and 18, respectively, at the lower side of the lead screws 17 and 18. One of the lead screws has a right thread and the other has a left thread.

Figure 4:
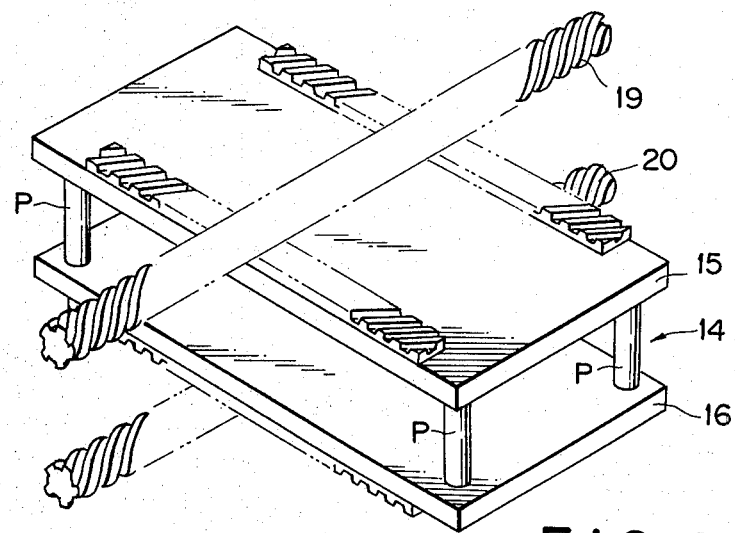
FIG. 4 is a perspective view showing the relation of the positions of the movable stage and lead screws in a third embodiment of the invention.

Referring to FIG. 4 showing the third embodiment of the present invention, helical racks are provided on the upper face of the upper plate 15 and on the lower face of the lower plate 16, and the lead screws 19 and 20 are meshed with the helical racks as shown. In this embodiment, both the upper and the lower lead screws 19 and 20 have a right thread or a left thread since one of the lead screws 19 is meshed with the helical rack at the lower side thereof and the other 20 is meshed at the upper side thereof.

Figure 5:
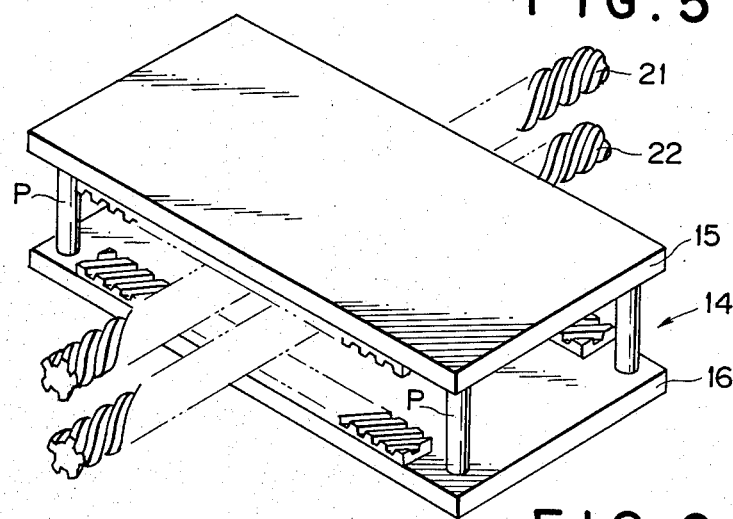
FIG. 5 is a perspective view showing the relation of the positions of the movable stage and lead screws in a fourth embodiment of the invention.

Referring to FIG. 5 showing the fourth embodiment of the present invention, helical racks are provided on the lower face of the upper plate 15 and on the upper face of the lower plate 16, and the lead screws 21 and 22 are meshed with the helical racks as shown. In this embodiment, both the lead screws 21 and 22 have a right thread or a left thread since one of the lead screws 21 is meshed with the helical rack at the upper side thereof and the other 22 is meshed at the lower side thereof.

Figure 6:
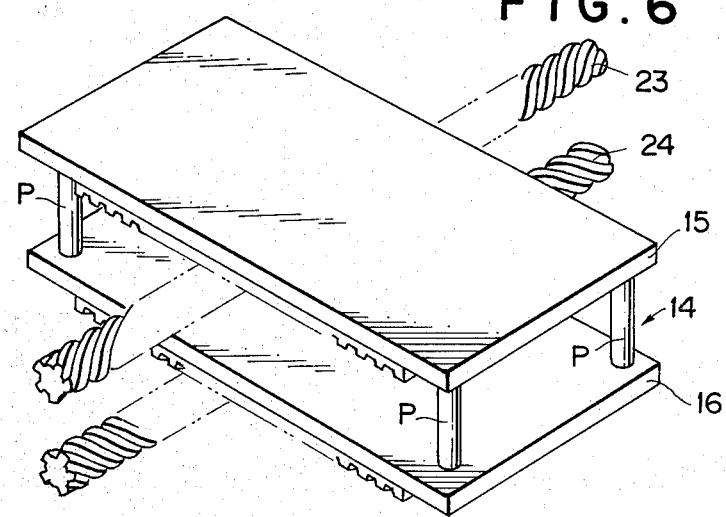
FIG. 6 is a perspective view showing the relation of the positions of the movable stage and lead screws in a fifth embodiment of the invention.

Referring to FIG. 6 showing the fifth embodiment of the present invention, quite oppositely to the embodiment shown in FIG. 3 the upper plate 15 is provided with a helical rack on the lower face thereof and the lower plate 16 is provided with a helical rack on the lower face thereof. Lead screws 23 and 24 are meshed with these racks as shown in the drawing. Similarly to the second embodiment as shown in FIG. 3, one of the lead screws has a right screw and the other has a left screw.

In the above described embodiments as shown in FIGS. 3 to 6, the direction of movement of the movable stage 14 is properly selected by properly selecting the direction of rotation of the pair of lead screws.

We claim:

1. A device for moving a stage on a plane in X and Y directions as desired comprising a pair of parallel lead screws, a pair of driving means for independently driving the pair of lead screws, a movable stage having a first face opposed to said first lead screw and a second face opposed to said second lead screw and extending in parallel to said first face, a first helical rack extending perpendicular to said first lead screw on said first face of the stage and meshed with said first lead screw, and a second helical rack extending perpendicular to said second lead screw on said second face of the stage and meshed with said second lead screw, teeth of said second helical rack extending in the direction of intersecting with teeth of said first helical rack.

2. A device for moving a stage as defined in claim 1 wherein said pair of lead screws both have a right thread or a left thread.

3. A device for moving a stage as defined in claim 2 wherein said movable stage is made of a single plate material, the upper face thereof is said first face and the lower face thereof is said second face.

4. A device for moving a stage as defined in claim 2 wherein said movable stage is made of a pair of flat plates extending in parallel to each other and coupled together.

5. A device for moving a stage as defined in claim 4 wherein said first face is the upper face of one of said flat plates and said second face is the lower face of the other plate.

6. A device for moving a stage as defined in claim 1 wherein one of said lead screws has a right thread and the other lead screw has a left thread.

7. A device for moving a stage as defined in claim 6 wherein said stage is made of a pair of flat plates coupled together and extending in parallel to each other.

8. A device for moving a stage as defined in claim 7 wherein said first face is the upper face of one of the flat plates and said second face is the upper face of the other flat plates.

9. A device for moving a stage as defined in claim 7 wherein said first face is the lower face of one of the flat plates and said second face is the lower face of the other flat plates.

10. A device for moving a stage as defined in any one of claims 1 to 9 wherein said pair of lead screws extending in parallel to each other are vertically spaced from each other above and in parallel to said base plate.

11. A device for moving a stage as defined in any one of claims 1 to 9 wherein said pair of driving means comprises a pair of electric motors of the same power connected with said lead screws independently of each other.

* * * * *